United States Patent [19]

Bukovics et al.

[11] Patent Number: 5,131,355
[45] Date of Patent: Jul. 21, 1992

[54] BALANCING ARRANGEMENT IN 8-CYLINDER, 4-STROKE ENGINES

[75] Inventors: Jurgen Bukovics, Heilbronn, Fed. Rep. of Germany; Gunther Ognar, Vienna, Austria

[73] Assignee: Audi AG, Ingolstadt, Fed. Rep. of Germany

[21] Appl. No.: 687,981

[22] Filed: Apr. 19, 1991

[30] Foreign Application Priority Data

Apr. 27, 1990 [DE] Fed. Rep. of Germany ....... 4013500

[51] Int. Cl.$^5$ ............................................. F02B 75/06
[52] U.S. Cl. .............................. 123/192.2; 123/55 VE
[58] Field of Search .......... 123/192 R, 192 B, 55 VE, 123/90.6

[56] References Cited

FOREIGN PATENT DOCUMENTS 0227277 7/1987 European Pat. Off. .

Primary Examiner—Noah P. Kamen
Attorney, Agent, or Firm—Kane, Dalsimer, Sullivan, Kurucz, Levy, Eisele and Richard

[57] ABSTRACT

In an arrangement for improving the mass balancing of the valve operating mechanism of an 8-cylinder, 4-stroke internal combustion engine with two rows of cylinders, which are disposed in V-shaped fashion and which have at least one camshaft 20, 22 with valve cams for operating the valves, a linearly movable balancing mass 32, 34 is assigned to at least one camshaft of each row of cylinders. The balancing masses are moved by balancing cams 40, 42 on these camshafts in opposite directions against the force of springs. The centers of gravity of the balancing masses move along straight lines 44, 46, which cross in the longitudinal central L of the internal combustion engine and lie symmetrically to this plane.

9 Claims, 3 Drawing Sheets

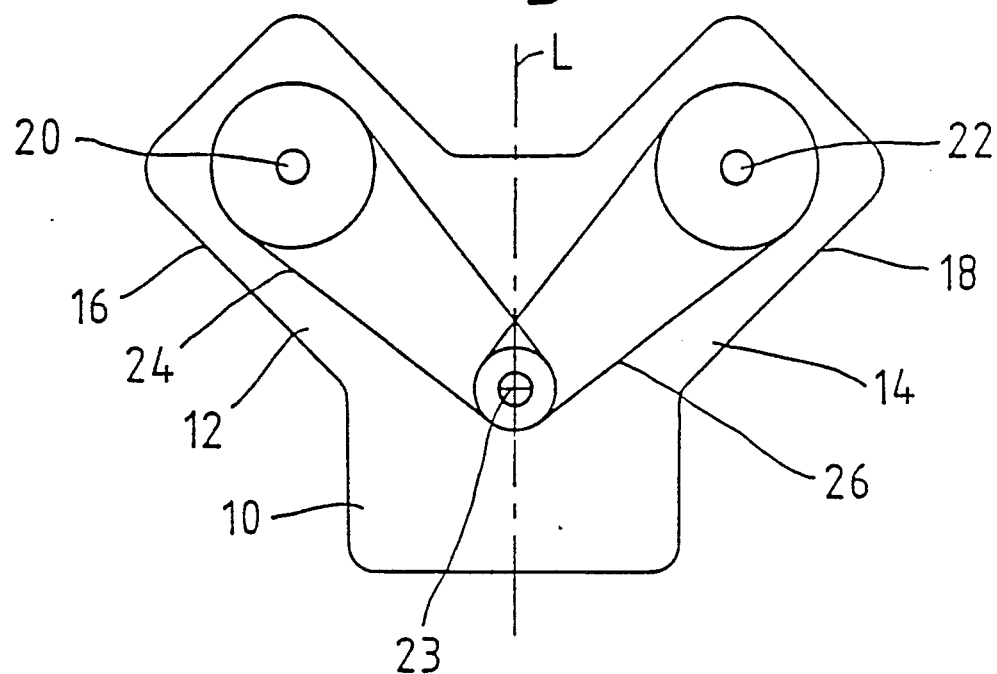
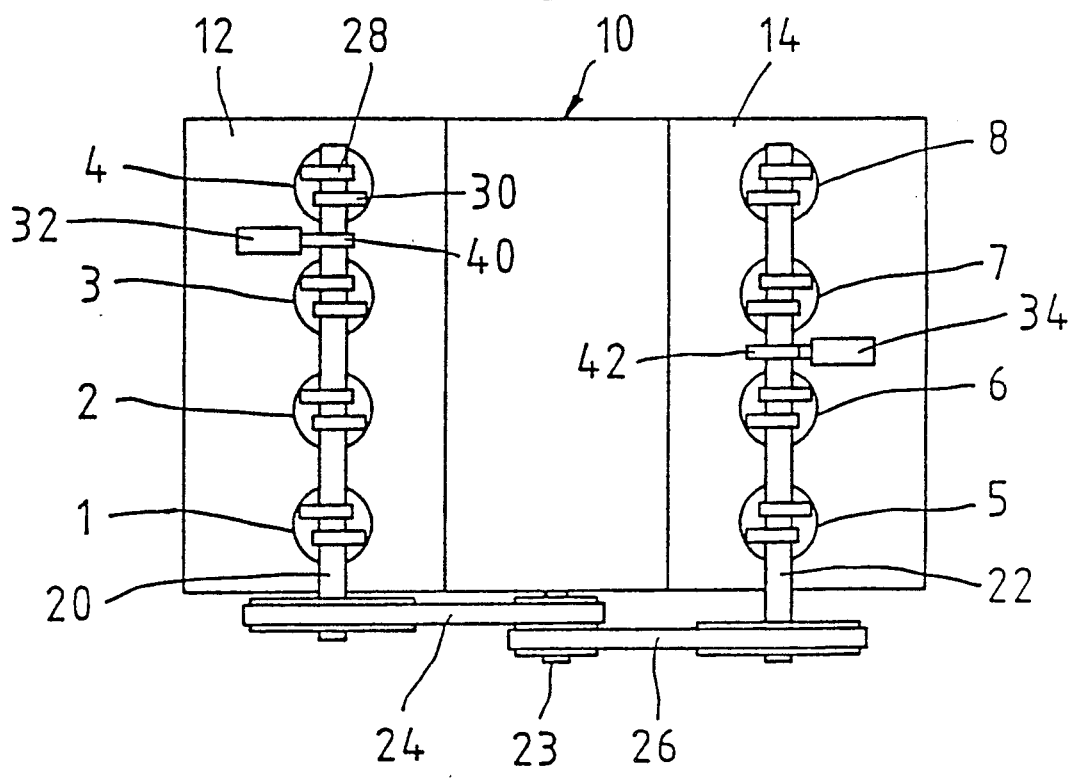

BALANCING ARRANGEMENT IN 8-CYLINDER, 4-STROKE ENGINES

FIELD OF THE INVENTION

The invention is directed to an arrangement for improving the balancing of masses of a valve operating mechanism of an 8-cylinder, 4-stroke internal combustion engine with two rows of cylinders (12, 14) arranged in V-shaped fashion, to which at least one camshaft (20, 28) for each row of cylinders with valve cams is assigned for operating the valves.

BACKGROUND OF THE INVENTION

In principle, for balancing the masses of a 4-stroke internal combustion engine, it is known from EP-A 227 277 to provide one or more linearly movable, spring-loaded balancing masses, which are shifted by balancing cams on the camshaft against the force of a spring.

It has now been ascertained that, in the case of an 8-cylinder, 4-stroke internal combustion engine with two rows of cylinders arranged in V-shaped fashion, vibrations stimulated by the free inertial forces and moments of the engine transmission block and the vibrations occurring essentially in all orders, are most pronounced in the third order of the free inertial forces and moments of the valve operating mechanism. A varying transverse force and, in addition, moments about all axes occur. The moments and the temporal relationships of the transverse force and the moments depend on the direction of motion of the valves and the control times.

SUMMARY OF THE INVENTION

It is an object of the invention to provide and arrangement, with which a balancing of the free inertial forces and moments of the valve operating mechanism for a V8 internal combustion engine is largely attained. Pursuant to the invention, this objective is accomplished by:
 a) a linearly movable, spring-loaded balancing mass (32, 34) which is assigned to one camshaft (20, 22) of each row of cylinders (12, 14),
 b) each of these camshafts carries a balancing cam (40, 42) with three symmetrically disposed elevations, which pushes the balancing mass against the force of the spring (36, 38),
 c) the two balancing cams (40, 42) are disposed in such a manner relative to one another that the two balancing masses (32, 34) are moved in opposite directions,
 d) the centers of gravity of the balancing masses (32, 34) move on straight lines (44, 46), which cross in the longitudinal center plane (L) of the internal combustion engine, which is placed through the axis of rotation of the crankshaft, and lie symmetrically to this plane.

The balancing masses are energized by the balancing cams to perform sinusoidal motions with three periods per revolution of the camshafts. Due to the fact that the two balancing masses are moved in opposite directions, a transverse force, which is diametrically opposed to the free inertial force, is produced. The amplitude of the motion of the balancing masses and the angular position of the balancing cams with respect to the valve cams are to be selected so that the desired mass compensation is effected. An angle is formed by the straight lines on which the centers of gravity of the compensation masses move. The longitudinal center plane of the internal combustion engine encloses an angle, which depends on the directions of motion of the valves operated by the valve cams. If the directions of motion of the valves, which are operated by the valve cams of a camshaft, lie in one plane, and a balancing cam is provided on each camshaft, then the direction of motion of the balancing mass, which is moved by the balancing cam seated on this camshaft, will also lie in this plane. This is the case when two camshafts, an inlet camshaft and an exhaust camshaft, are provided per row of cylinders.

When balancing masses are provided for an internal combustion engine having two camshafts per row of cylinders, a balancing cam is disposed on each of the two camshafts on the inside or outside of the camshafts. The directions of motion of the centers of gravity of the two balancing masses are so placed that, when looking in the direction of the axis of rotation of the crankshaft, they cross at a point, which lies in the longitudinal center plane of the internal combustion engine between the intersections of the directions of motion of the valves. A corresponding position of the directions of motion of the centers of gravity of the two balancing masses is also provided when only one camshaft is provided per row of cylinders, in which case the valve cams of this camshaft operate inlet and exhaust valves, the directions of motion thereof not lying in one plane.

The balancing of the moments originating from the motion of the valve operating mechanism about the traverse axis and vertical axis can be attained by the appropriate positioning of the balancing masses in the longitudinal direction of the internal combustion engine. From practical considerations, only one position between the cylinders comes into consideration. For a firing order of 1 5 4 8 6 3 7 2, an optimum compensation is achieved by disposing the balancing weights between cylinders 3, 4 and 6, 7. However, the disposal of the balancing masses between the cylinders 2, 3 and 5, 6, between the cylinders 2, 3 and 6, 7 and between the cylinders 3, 4 and 5, 6 is also recommendable.

BRIEF DESCRIPTION OF THE DRAWINGS

Embodiments of the invention are described in the following with reference to the drawings, in which FIG. 1 shows a diagrammatic representation of a front view of a V8 internal combustion engine with one cam shaft per row of cylinders, FIG. 2 shows a diagrammatic representation of the plan view of the internal combustion engine of FIG. 1 with the valve rocker arm cover removed.

DETAILED DESCRIPTION OF THE PREFERRED EMBODIMENT

Figure 3:
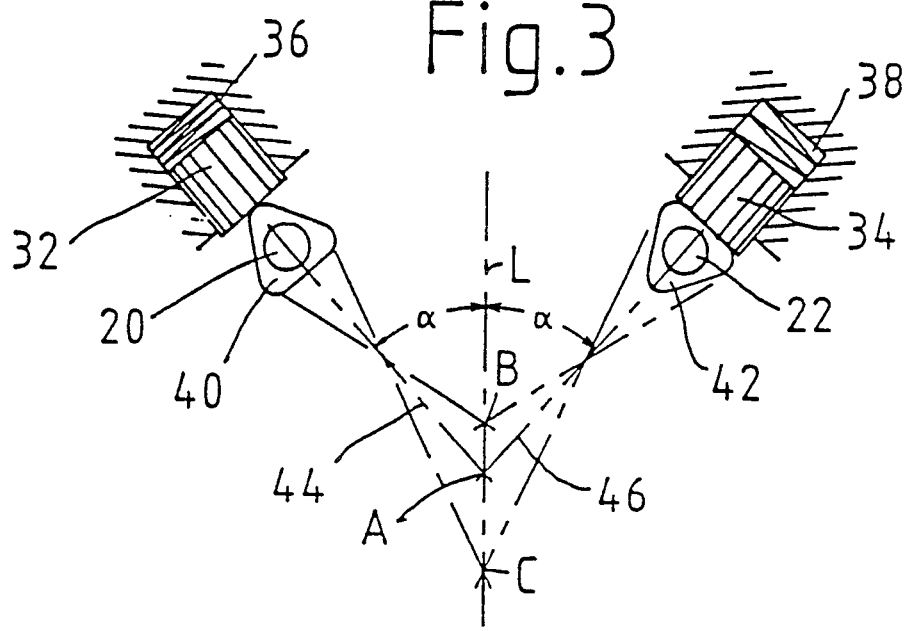
FIG. 3 shows an arrangement of the balancing masses for the internal combustion engine of FIGS. 1 and 2 looking in the direction of the axis of rotation of the crankshaft.

FIG. 1 shows a V8 internal combustion engine diagrammatically, having cylinder crankcase 10 with two rows of cylinders 12 and 14, disposed in V-shaped fashion, upon which are cylinder heads 16 and 18. On each cylinder head, a camshaft 20 or 22 is mounted, which is driven by the crankshaft 23 through a traction mechanism 24, 26 exhibiting half the r.p.m. of the crankshaft. The row of cylinders 12 contains the cylinders 1 to 4 and the row of cylinders 14 contains the cylinders 5 to 8. Each camshaft 20, 22 carries one inlet valve cam 28 and one exhaust valve cam 30 per cylinder. In order to attain extensive compensation of the free inertial forces and moments of the valve operating mechanism, a linearly movable balancing mass 32 or 34 is provided for each camshaft 20, 22. The linearly movable balancing mass 32 or 34 is acted upon by a spring 36 or 38 and can be shifted by a balancing cam 40 or 42 with three symmetrically disposed elevations against the force of the springs 36, 38. As can be seen from FIG. 3, the two cams 40, 42 are disposed relative to one another, so that the balancing masses 32, 34 carry out opposite motions. In other words, when balancing mass 32 is moving upwards in FIG. 3, balancing mass 34 is moving downwards. At the same time, the centers of gravity of the balancing masses 32, 34 move on straight lines 44, 46, crossing at the intersection with longitudinal center line L of the internal combustion engine, L being placed through the axis of rotation of the crankshaft (see FIG. 1) and lines 44, 46 lie symmetric to this plane, thus forming the same angle α with this plane. This point of intersection A of the two straight lines 44, 46 with the longitudinal center plane L lies between the points of intersection where lines cross at B and where lines cross at C, these lines respectively representing the directions of motion of the valves, which are operated by the valve cams of the two camshafts 20, 22.

With reference to FIG. 2, the balancing of the moments about the transverse and vertical axis effected by the balancing masses 32, 34 which are disposed between cylinders 3 and 4 and between cylinders 6 and 7, assuming that the firing order is 1 5 4 8 6 3 7 2.

The size of the balancing masses, their vibrational amplitudes and the angular position of the balancing cams 40, 42 relative to the valve cams depends on the masses to be balanced and the moments of the valve operating mechanism and these, in turn, depend on the valve masses, the geometry and the control times of the valve operating mechanism.

Figure 4:
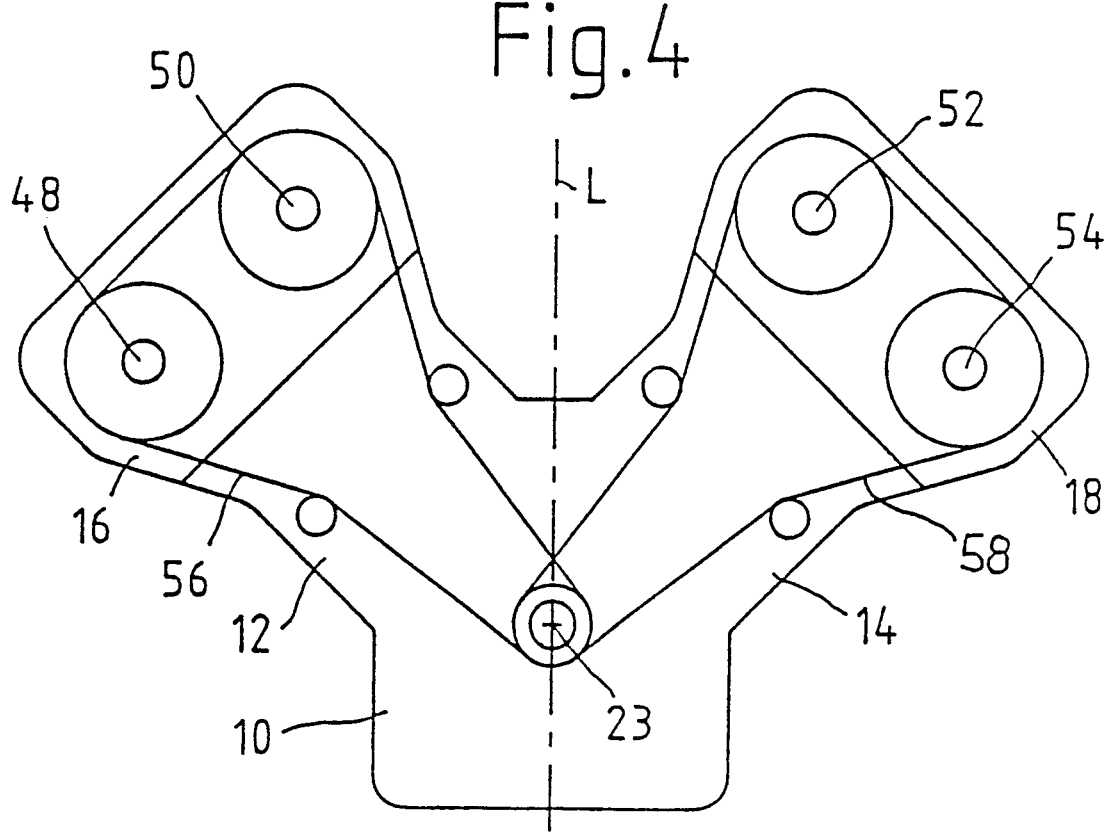
FIG. 4 shows a diagrammatic representation of a front view of a V8 internal combustion engine with two camshafts per row of cylinders.

FIG. 4 shows a diagrammatic representation of an 8-cylinder 4-stroke internal combustion engine, once again with a cylinder crankcase 10 with two rows of cylinders 12 and 14, on each of which there is a cylinder head 16 and 18 respectively, in which two camshafts 48, 50 and 52, 54 respectively are mounted, each being driven by the crankshaft 23 through a traction mechanism 56 and 58 which drive camshafts 48, 50 and 52, 54, respectively. One of the camshafts 48, 50 and one of the camshafts 50, 52 operates the inlet valves of the cylinders in cylinder rows 12 and 14, while the other camshaft of each respective pair operates the exhaust valve.

Figure 5:
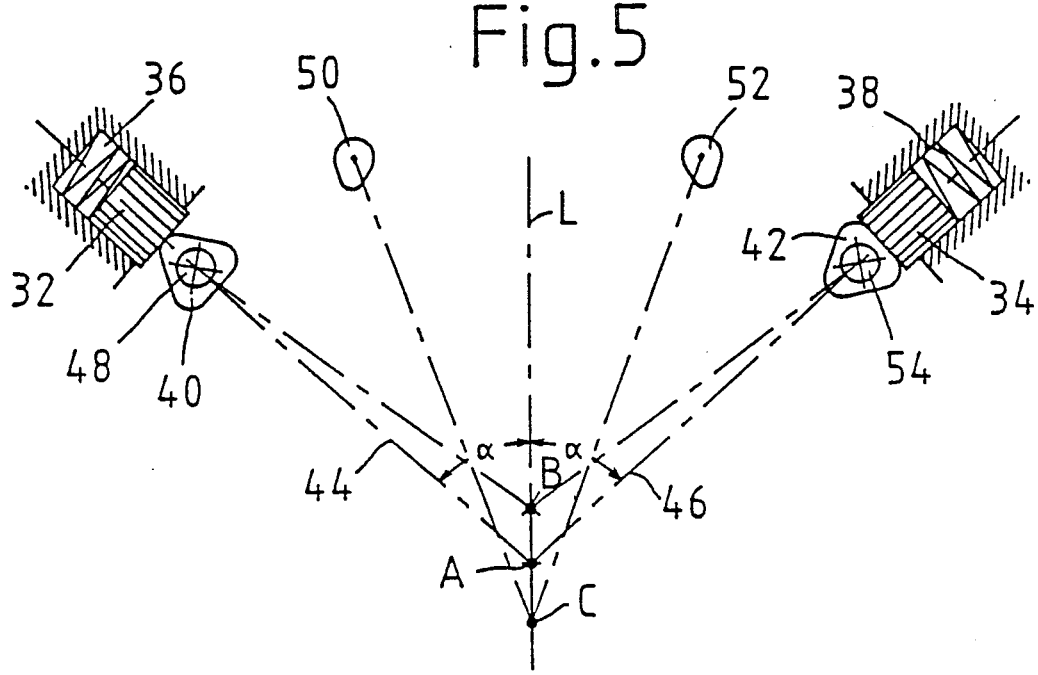
FIG. 5 shows an arrangement of two balancing masses for the internal combustion engine of FIG. 4, looking in the same direction as in FIG. 3.

FIG. 5 shows a mass balancing arrangement for the internal combustion engine of FIG. 4, with two linearly movable balancing masses 32, 34, each of which is respectively subjected to the action of a springs 36 and 38. For the linear motion of these balancing masses, a balancing cam 40 or 42 with three elevations is disposed on each camshaft 48, 54. The relative position of these balancing cams is the same as that shown if FIG. 3 and is such that the one balancing mass 32 is at its upper dead center when the other balancing mass 34 is at its lower dead center. The balancing masses 32, 34 are shifted in opposite directions as the camshafts 48, 54 are rotated. Balancing mass 32 in FIG. 5 thus moves downwards when balancing mass 34 moves upwards. As in the embodiment of FIG. 3, the centers of gravity of the balancing masses move on straight lines 44, 46, which cross in the longitudinal center plane L of the internal combustion engine and enclose the same angle α. The crossing point A lies between the intersection or crossing points B and C of the directions of motion of the valves, which are operated by the valve cams of the camshafts 48, 50, 52 and 54. These directions of motion are shown by the broken lines. The two balancing masses 32, 34 and the balancing cams 40, 42 can also be assigned to the two camshafts 50, 52 located on the interior.

Figure 6:
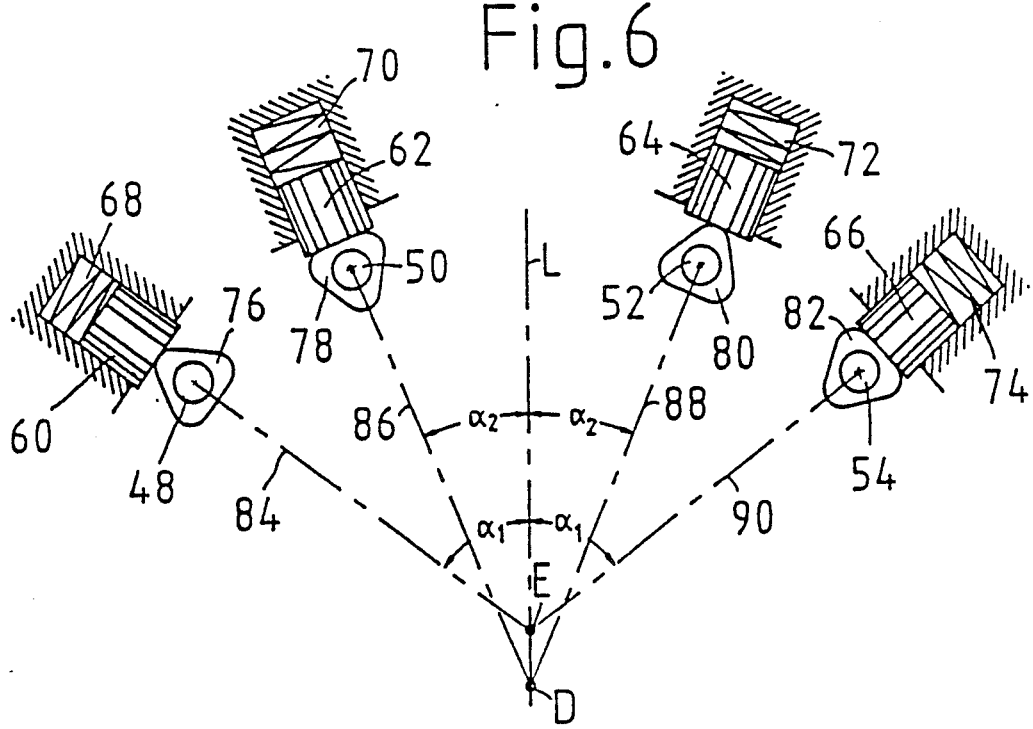
FIG. 6 shows an arrangement of four balancing masses for an internal combustion engine of FIG. 4 looking in the same direction as FIG. 3.

FIG. 6 shows a mass balancing arrangement for the internal combustion engine of FIG. 4. A balancing mass 60, 62, 64, 66 is assigned to each camshaft 48 to 54. Each balancing mass is acted upon by a spring 68, 70, 72, 74. On each camshaft 48, 50, 52, 54, there is a balancing cam 76, 78, 80, 82, which linearly shifts the associated balancing mass against the force of the spring with which it is associated. The centers of gravity of these balancing masses 60 to 66 move along straight lines 84, 86, 88, 90. The straight lines 84 and 90 of the balancing masses 60, 66, which are assigned to the outer camshafts 48, 54 intersect at point E and the straight lines 86, 88 of the balancing masses 62, 64, assigned to the two camshafts 78, 80 on the inside, intersect at point D, lying in the longitudinal center plane L of the internal combustion engine. The straight lines 84 and 90 enclose the same angle $\alpha_1$ with the plane L and the straight lines 86 and 88 in turn enclose the same angle $\alpha_2$ with the plane L. The straight lines 84 to 90 coincide with the directions of motion of the valves, which are operated by the valve cams of the camshafts. The advantage of the arrangement with four balancing masses is that the individual masses are smaller and their direction of motion coincides with the direction of motion of the valves. An additional advantage is that the quality of the mass balancing is not affected by the use of adjustable camshafts for changing the valve control times.

The balancing mass 32 of FIG. 5, as well as the balancing masses 60 and 62 of FIG. 6 are disposed between cylinders 3 and 4 and the balancing mass 34 or the balancing masses 64 and 66 are disposed between cylinders 6 and 7, as they are in FIG. 2,. However, the other arrangements, which were discussed previously, are also possible.

The shape of the balancing cam preferably is such, that the course of the motion of the balancing masses is sinusoidal. By these means, undesirable effects at higher orders are avoided.

We claim:

1. An arrangement for improving the mass balancing of the valve driving mechanism of an 8-cylinder 4stroke internal combustion engine with two rows of cylinders (12, 14) arranged in V-shaped fashion, to which at least one camshaft for each row of cylinders with valve cams is assigned for operating the valves, comprised of the following features:

a) a linearly movable, spring-loaded balancing mass (32, 34) is assigned to one camshaft (20, 22) of each row of cylinders (12, 14),
b) each of these camshafts carries a balancing cam (40, 42) with three symmetrically disposed elevations, which push the balancing mass against the force of the spring (36, 38),
c) the two balancing cams (40, 42) being disposed in such a manner relative to one another so that the two balancing masses (32, 34) are moved in opposite directions,
d) the centers of gravity of the balancing masses (32, 34) moving on straight lines (44, 46), which cross in the longitudinal center plane (L) of the internal combustion engine placed through the axis of rotation of the crankshaft, the lines upon which the balancing masses move lying symmetrically to this plane.

2. The arrangement of claim 1 for an internal combustion engine further comprised of two camshafts (48, 50 and 52, 54) for each row of cylinders (12, 14), with two camshafts (50, 52) being on the interior of the engine and two camshafts (48, 54) being on the exterior of the engine in which the directions of motion of the valves operated by the valve cams of the interior camshafts (50, 52) cross at a first point (C) and the directions of motion of the valves operated by the valve cams of the exterior camshafts (48, 54) cross at a second point (B) in the longitudinal center plane (L) of the internal combustion engine, which is placed through the axis of rotation of the crankshaft, characterized in that the balancing cams (40, 42), which actuate the balancing masses (32, 34), are disposed on the two exterior camshafts (48, 54) or on the two interior camshafts (50, 52) and that the point of intersection (A) of the directions of motion (44, 46) of the centers of gravity of the two balancing masses (32, 34) lie on the longitudinal center place (L) between the points of intersection (B, C) of the directions of rotation of the valves.

3. An arrangement to improve the mass compensation of the valve operating mechanism of an 8-cylinder, 4-stroke internal combustion engine having two rows of cylinders (12, 14), which are disposed in V-shaped fashion and each row of cylinders being provided with two camshafts (48, 50 52, 54) having valve cams for operating the valves with two of the camshafts (48, 54) being on the exterior of the engine and two of the camshafts (50, 52) being on the interior of the engine, comprised of the following features:
a) each camshaft (48 to 54) having a linearly displaceable, spring-loaded balancing mass (60 to 66),
b) each camshaft carrying a balancing cam (76 to 82) with three symmetrically disposed elevations, for shifting the assigned balancing mass against the force of a spring,
c) the balancing (78, 80) on the two interior camshafts (50, 52) and the balancing cams (76, 82) on the two exterior camshafts (48, 54) for each row of cylinders (12. 14) being disposed relative to one another so that the balancing masses (62, 62 and 64, 66) associated with each camshaft are moved in opposite directions,
d) the centers of gravity of the balancing masses (62, 64), which are shifted by the balancing cams (78, 80) of the two interior camshafts (50, 52), and the centers of gravity of the balancing masses (60, 66) which are shifted by the balancing cams (76, 82) of the two exterior camshafts (48, 54), move along straight lines (86, 88 or 84, 90), which cross in the longitudinal central plane (L) of the internal combustion engine placed through the axis of rotation of the crank shaft, and lie symmetrically to this plane.

4. The arrangement of claim 3, wherein the directions of motion (84 to 90) of the centers of gravity of the balancing masses (60 to 66) run parallel to the directions of motion of the valves driven by the respective camshafts (48 to 54).

5. The arrangement as in one of claims 1 to 4 for a V8 internal combustion engine with a firing order of 1 5 4 8 6 3 7 2, wherein the balancing masses (32, 34 or 60, 62 and 64, 66) are located between cylinders 3 and 4 and between cylinders 6 and 7.

6. The arrangement as in one of claims 1 to 4 for a V8 internal combustion engine with a firing order of 1 5 4 8 6 3 7 2, wherein the balancing masses are disposed between cylinders 2 and 3 and between cylinders 5 and 6.

7. The arrangement as in one of claims 1 to 4 for a V8 internal combustion engine with a firing order of 1 5 4 8 6 3 7 2, wherein the balancing masses are disposed between cylinders 2 and 3 or between cylinders 6 and 7.

8. The arrangement as in one of claims 1 to 4 for a V8 internal combustion engine with a firing order of 1 5 4 8 6 3 7 2, wherein the balancing masses are disposed between cylinders 3 and 4 and between cylinders 5 and 6.

9. The arrangement as in one of claims 1 to 4, characterized in that the shape of the balancing cam is selected so that the balancing masses carry out a sinusoidal motion.

* * * * *